Oct. 12, 1943.   J. V. MORRES   2,331,414
GARDEN TOOL
Filed March 23, 1943
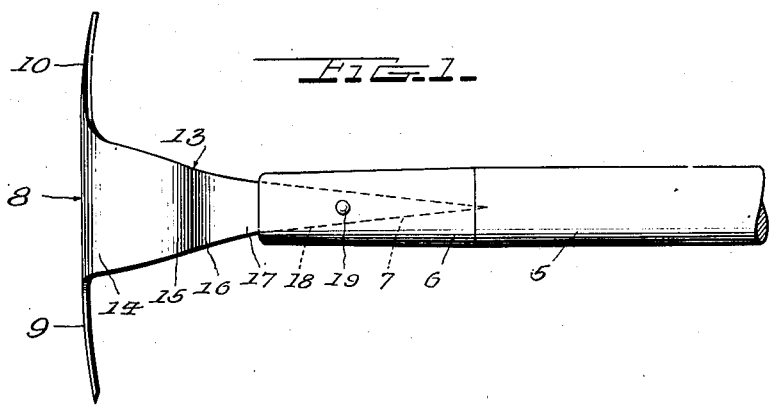
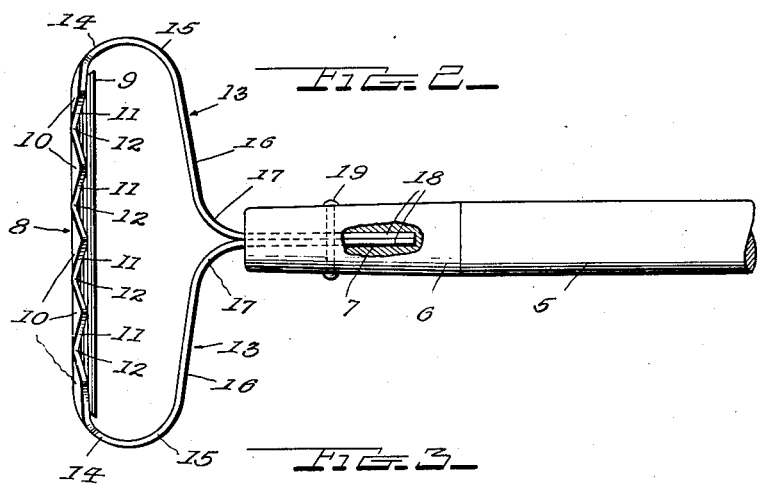
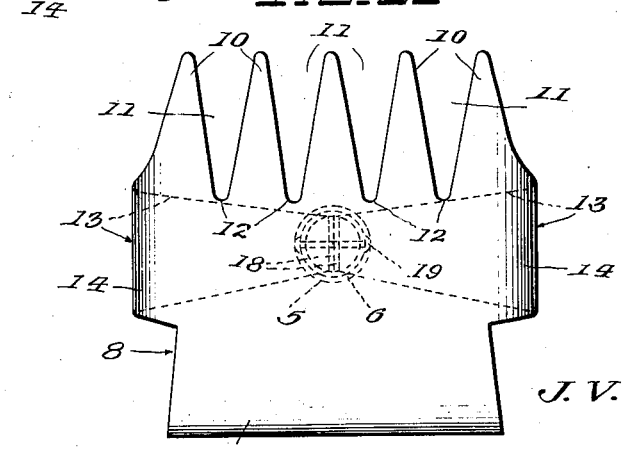
Inventor
J. V. Morres.
By H. B. Wilson & Co.
Attorney Patented Oct. 12, 1943

2,331,414

UNITED STATES PATENT OFFICE 2,331,414

GARDEN TOOL

Joseph V. Morres, Deleon Springs, Fla.

Application March 23, 1943, Serial No. 480,232

1 Claim. (Cl. 97—71)

The invention aims to provide a simple, inexpensive, efficient and easily operable hand tool for working "Victory gardens" and the like, and the tool preferably comprises both a hoe blade and a set of teeth which may be used both for raking and weed pulling.

Another object of the invention is to provide novel gauges projecting laterally from the hoe blade to aid the gardener, particularly if he be a novice, in terminating his hoeing a safe distance from plants without danger of injuring their roots or possibly cutting off an entire plant.

A still further object is to provide the tool with outwardly tapered rake and weed pulling teeth and with inwardly tapered notches between said teeth, whereby the tool may not only be used for raking but may constitute an effective weed puller to permit pulling of weeds while the gardener stands erectly, the inner ends of the notches being somewhat rounded to prevent the weeds from wedging so tightly into them as to require removal by hand.

Yet another object is to provide the blade with a pair of novel arms which connect it with the handle, and to so form said arms that they constitute the gauges hereinbefore mentioned.

With the foregoing in view, the invention resides in the novel subject matter hereinafter described and claimed, description being accomplished by reference to the accompanying drawing.

Fig. 1 is a side elevation.

Fig. 2 is either a top or bottom view according to the manner in which the tool is used.

Fig. 3 is a front elevation.

A preferred construction has been illustrated and will be specifically described, with the understanding that variations may be made within the scope of the invention as claimed.

A conventional hoe or rake handle 5 is shown having the usual ferrule 6 at its front end, said end being provided with a longitudinal opening 7 which may either be of cylindrical form as usual, or if desired, of rearwardly tapered form.

The head of the tool is denoted at 8 and consists of a substantially flat plate disposed in a plane transverse to the straight handle, the plate being formed on one side of the handle with a hoe blade and on the opposite side with a combined rake and weed-pulling blade. The hoe portion is denoted at 9 and the set of rake and weed-pulling teeth at 10. These teeth are V-shaped and are formed in a row by V-shaped notches 11 which extend from the outer edge of the blade to substantially the full depth or height of it as clearly shown in Fig. 3. These notches form the relatively long and narrow outwardly tapered teeth 10 which may be sharply or bluntly pointed as desired. The inwardly tapered notches 11 are also relatively narrow and of a size to receive and pull weeds and the like. The inner ends 12 of the notches are curved or rounded to prevent the weeds from wedging so tightly into them as to require removal by hand. Thus, hoeing, raking and weed-pulling operations may all be performed with the tool, enabling the gardener to stand upright and thus overcoming the necessity of a great deal of back-breaking work.

Two arms 13 are integral with the vertical edges of the head 8 and are cut from the same piece of sheet material from which said head is stamped or otherwise constructed. Each arm curves outwardly and rearwardly at 14 from the head 8, then curves inwardly and rearwardly as at 15, then extends inwardly, preferably somewhat obliquely, as denoted at 16, and is then curved rearwardly at 17, the terminals of the arms extending rearwardly from the curvatures 17 and constituting two prongs 18 secured in the opening 7. These prongs are preferably rearwardly tapered as shown, permitting them to wedge tightly in the handle opening 7 when driven into the same. If desired, a rivet or the like 19 may pass through the front end of the handle 5 and ferrule 6 and through the prongs 18, thus securely fastening the handle and the head 8 together.

From the foregoing, taken in connection with the accompanying drawing, it will be seen that a novel and advantageous construction has been provided, particular attention being directed to the projection of the arm portions 14 and 15 beyond the upper portions of the vertical edges of the hoe portion 9, and to the inward and rearward curving of said portion 15. By this or an equivalent construction, the arms constitute gauges projecting laterally from the hoe to aid the gardener in terminating his hoeing a safe distance from plants, without danger of seriously cutting their roots or perhaps cutting off an entire plant. It will also be noted that the curved lateral projecting portions 14, 15 of the arms serve as guards to deflect the hoe blade away from the roots of a plant should such portions strike the stem or stalk of a shrub or other plant. Attention is also invited to the raking and weed-pulling adaptability of the tool, and to the fact that the notches 11 between the teeth 10 have rounded inner ends 12 which prevent such tight wedging of weeds and the like into them as to require removal by hand. It will be seen that the single tool combines the necessary features to permit practically all working of "Victory gardens" and the like, to be performed without squatting or stooping, thus saving a great deal of back-breaking work and, therefore, appealing particularly to novices raising gardens as a patriotic duty.

While preferences have been disclosed, attention is again invited to the possibility of making variations within the scope of the invention as claimed.

I claim:

A garden tool comprising a straight handle, a substantially flat and rectangular hoe blade disposed in a plane at right angles to the axis of said handle and provided with a straight outer cutting edge and vertical side edges, and two arms connecting the upper portion of the sides of said blade with said handle, said arms extending laterally outward from said vertical side edges of the hoe blade and then curved rearwardly and inwardly to said handle, said curved portions of the arms beyond the vertical edges of the hoe blade acting as gauges to aid the gardener in terminating his hoeing a safe distance from plants and also serving as guards to engage the base of a plant stalk to deflect the hoe blade away from the roots.

JOSEPH V. MORRES.